US009147960B2

(12) United States Patent
Kojima et al.

(10) Patent No.: US 9,147,960 B2
(45) Date of Patent: Sep. 29, 2015

(54) CONNECTOR

(75) Inventors: Hiroshi Kojima, Makinohara (JP);
Tsutomu Sawada, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/119,219

(22) PCT Filed: May 22, 2012

(86) PCT No.: PCT/JP2012/003330
§ 371 (c)(1),
(2), (4) Date: Nov. 21, 2013

(87) PCT Pub. No.: WO2012/160807
PCT Pub. Date: Nov. 29, 2012

(65) Prior Publication Data
US 2014/0187066 A1    Jul. 3, 2014

(30) Foreign Application Priority Data

May 26, 2011   (JP) .................................. 2011-118241

(51) Int. Cl.
*H01R 13/44*  (2006.01)
*H01R 13/453*  (2006.01)
*H01R 13/447*  (2006.01)
(Continued)

(52) U.S. Cl.
CPC .......... *H01R 13/453* (2013.01); *B60L 11/1818* (2013.01); *H01R 13/447* (2013.01); *H01R 13/5213* (2013.01); *H01R 13/533* (2013.01); *H01R 2201/26* (2013.01); *Y02T 10/7005* (2013.01); *Y02T 90/14* (2013.01)

(58) Field of Classification Search
USPC .......................... 439/136, 142–144, 131, 135
See application file for complete search history.

(56) References Cited

U.S. PATENT DOCUMENTS 5,582,521 A     12/1996  Mori et al.
5,951,309 A *   9/1999   Hopper ........................ 439/142
(Continued)

FOREIGN PATENT DOCUMENTS

FR     1448070 A     8/1966
FR     1491261 A     8/1967
(Continued)

OTHER PUBLICATIONS

International Search Report and Written Opinion dated Aug. 6, 2012, issued for PCT/JP2012/003330.
(Continued)

*Primary Examiner* — Jean F Duverne
(74) *Attorney, Agent, or Firm* — Locke Lord LLP; James E. Armstrong, IV; Brian S. Matross

(57) ABSTRACT

To provide a connector of which cover is easily opened even when the cover is firmly fixed to a housing due to freezing, and cannot be opened by only biasing force of a spring. A connector 1 includes: a housing 2; a cover 3 pivotally supported by the housing 2, and opening and closing openings 21*a*, 22*a* of the housing 2; and a lock 4 pivotally supported by the housing 2 and keeping the cover 3 covering the openings 21*a*, 22*a* by hooking on an edge 33 of the cover 3 covering the openings 21*a*, 22*a*. The lock 4 is provided with a base 40, a pushing claw 42, and a projection 43. The connector 1 is formed so that the edge 33 of the cover 3 positioned between the pushing claw 42 and the projection 43 is overlapped with a rotation track of the projection 43.

2 Claims, 5 Drawing Sheets

(51) Int. Cl.
*H01R 13/52* (2006.01)
*H01R 13/533* (2006.01)
*B60L 11/18* (2006.01)

(56) References Cited

U.S. PATENT DOCUMENTS

| | | | | |
|---|---|---|---|---|
| 6,089,888 | A | * | 7/2000 | Miller ............................ 439/142 |
| 6,132,227 | A | * | 10/2000 | Boteler et al. ................. 439/142 |
| 7,059,877 | B2 | * | 6/2006 | Guzelderli .................... 439/142 |
| 8,123,065 | B2 | | 2/2012 | Mitsuhashi |

FOREIGN PATENT DOCUMENTS

| | | |
|---|---|---|
| FR | 2551272 A1 | 3/1985 |
| JP | H07192804 A | 7/1995 |
| JP | 2002-216882 A | 8/2002 |
| JP | 4049800 B2 | 2/2008 |

OTHER PUBLICATIONS

Notification of Reasons for Refusal issued in corresponding Japanese Patent Application No. Jp 2011-118241, dated Feb. 3, 2015.

* cited by examiner

CONNECTOR

TECHNICAL FIELD

This invention relates to a covered connector connected to a connector of a charging cable or the like.

BACKGROUND ART

FIG. 8 is a sectional view showing a conventional connector (see PLT1). A connector 201 shown in this figure is mounted on an electric vehicle, and connected to a connector of a charging cable for charging a battery of the electric vehicle.

This connector 210 includes: a housing 202; a cover 203 pivotally supported by the housing 202, and opening and closing an opening of the housing 202; a spring 205 biasing the cover 203 toward a side away from the opening; a lock 204 for keeping the cover 203 closing the opening by hooking on an edge 233 of the cover 203 closing the opening; and a spring 206 biasing the lock 204 toward a side close to the opening.

The cover 203 opens the opening when the connector of the charging cable is inserted into the housing 202, and covers the opening any time other than charging to prevent water or dust from entering the housing 202.

The lock 204 is provided with a base 240 having a shaft hole into which a support shaft is inserted; a pushing claw 242 projected from the base 240, and positioned at an outer surface side of the cover 203 covering the opening; and a projection 243 projected from the base 240, and arranged nearer the shaft hole side than the pushing claw 242. This lock 204 is hooked on an edge 233 in a manner that the edge 233 of the cover 203 covering the opening is positioned between the pushing claw 242 and the projection 243.

Further, a dashed line K in FIGS. 8 and 9 indicates a rotation track of the projection 243. As known from FIGS. 8 and 9, the edge 233 of the cover 203 covering the opening is not overlapped with the rotation track K of the projection 233.

Next, an open/close operation of the cover 203 of the connector 201 will be explained. When closing the opened cover 203, while the lock 204 is rotated toward a side away from the opening of the housing 202 against a biasing force of the spring 206, the cover 203 is rotated to a position covering the opening against a biasing force of the spring 205, and the lock 204 is released to hook the lock 204 on the edge 233 of the cover 203. Further, when opening the closed cover 203, the lock 204 is rotated toward a side away from the opening and the cover 203 against the biasing force of the spring 206. Namely, the lock 204 is released. Then, the cover 203 is automatically opened due to the biasing force of the spring 205.

CITATION LIST

Patent Literature

[PLT1]
J, A, 2002-216882

SUMMARY OF INVENTION

Technical Problem

However, in the conventional connector 201 described above, there is a problem as follows. Namely, due to freezing of water attached to a surface or the like of the cover 203, the cover 203 is firmly fixed to the housing 202, and even when the lock 204 is released, the cover 203 is not opened due to only the biasing force of the spring 205. Further, when the biasing force of the spring 205 is increased, a size of the spring 205 is increased. Therefore, there is a problem that the connector 201 becomes capsized.

Accordingly, an object of the present invention is to provide a connector of which cover is easily opened even when the cover is firmly fixed to the housing due to freezing, and cannot be opened by only the biasing force of the spring.

Solution to Problem

For attaining the object, according to the invention claimed in claim 1, there is provided a connector comprising:
a housing;
a cover pivotally supported by the housing, and opening and closing an opening of the housing;
a spring biasing the cover toward a side away from the opening; and
a lock pivotally supported by the housing and keeping the cover covering the opening by hooking on an edge of the cover covering the opening,
wherein the lock is provided with: a base having a shaft hole into which a support shaft is inserted; a pushing claw projected from the base and positioned at an outer surface side of the cover covering the opening; and a projection projected from the base and positioning the edge of the cover between the pushing claw and the projection, and
wherein the edge of the cover positioned between the pushing claw and the projection is overlapped with a rotation track of the projection.

According to the invention claimed in claim 2, there is provided the connector as claimed in claim,
wherein one of the edge of the cover and the projection is provided with a protrusion projected toward the other of the edge of the cover and the projection.

Advantageous Effects of Invention

According to the invention claimed in claim 1, the lock is provided with a base having a shaft hole into which a support shaft is inserted; a pushing claw projected from the base and positioned at an outer surface side of the cover covering the opening; and a projection projected from the base and positioning the edge of the cover between the pushing claw and the projection, and the edge of the cover positioned between the pushing claw and the projection is overlapped with a rotation track of the projection. Therefore, in a case that the cover is firmly fixed to the housing due to freezing, and cannot be opened by only the biasing force of the spring, when the lock is rotated toward a side away from the opening and the cover, the projection of the lock pushes the cover toward a side away from the opening, and the cover is opened easily.

According to the invention claimed in claim 2, one of the edge of the cover and the projection is provided with a protrusion projected toward the other of the edge of the cover and the projection. Therefore, by only adding the protrusion to an existing connector, the edge of the projection can be formed to be overlapped with the rotation track of the projection.

BRIEF DESCRIPTION OF DRAWINGS

FIG. 1 is a sectional view showing a connector according to an embodiment of the present invention, and showing a state that an opening of a housing is opened by a cover.

FIG. 2 is a sectional view showing the connector shown in FIG. 1, and showing a state that the cover covers the opening of the housing.
FIG. 3 is a plan view showing the cover shown FIG. 1.
FIG. 4 is a side view showing the cover shown in FIG. 1.
FIG. 5 is a sectional view taken on line F-F of FIG. 4.
FIG. 6 is an explanatory view showing rotation tracks of the cover and a lock of the connector shown in FIG. 1.
FIG. 7 is an enlarged view showing G-portion in FIG. 6.
FIG. 8 is a sectional view showing a conventional connector.
FIG. 9 is an enlarged view showing J-portion in FIG. 8.

DESCRIPTION OF EMBODIMENTS

A connector according to an embodiment of the present invention will be explained with reference to FIGS. 1 to 7.

Figure 1:
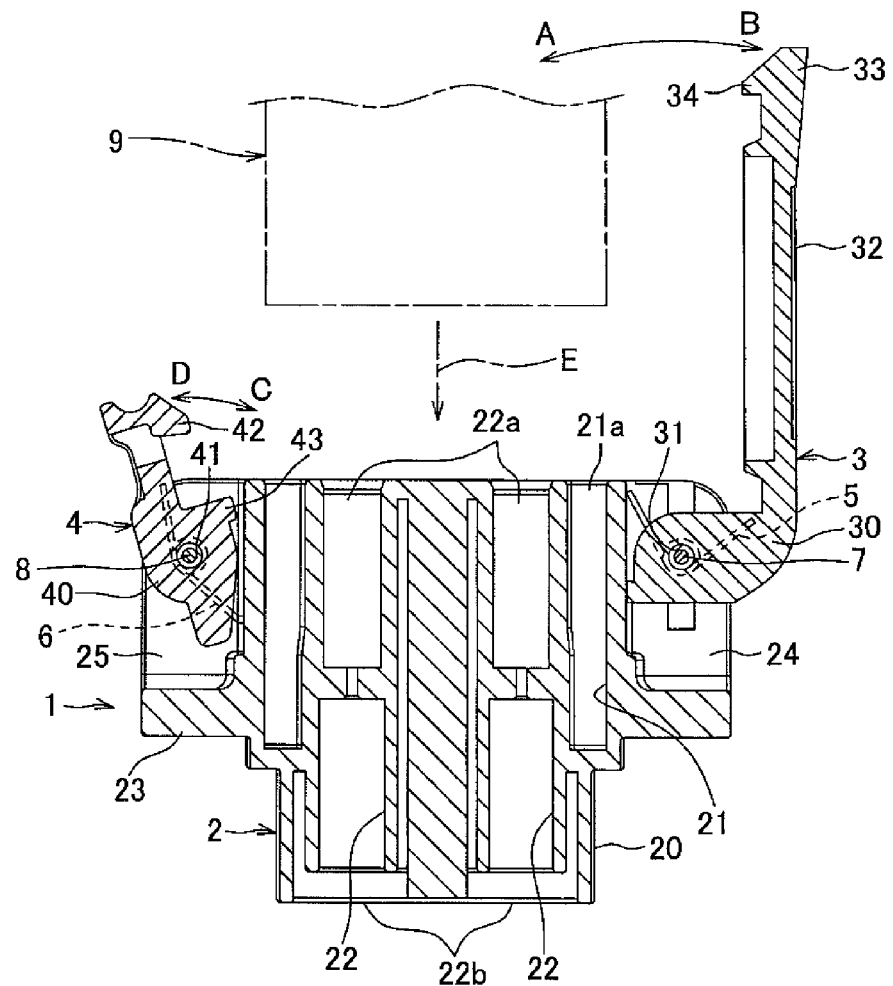
[FIG. 1]
Figure 2:
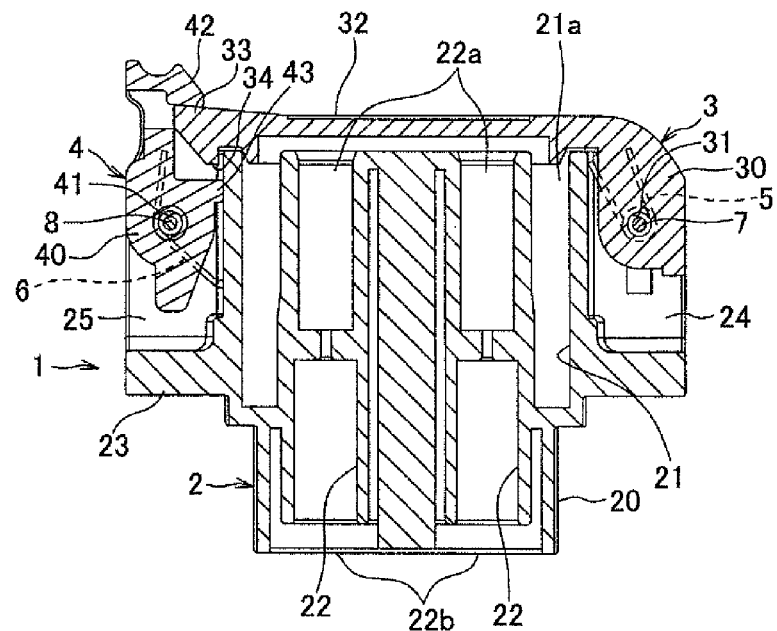
[FIG. 2]

A connector 1 shown in FIGS. 1 and 2 is mounted on an electric vehicle, and connected to a connector 9 of a charging cable for charging a battery of the electric vehicle. This connector 1 includes: a housing 2; a cover 3 pivotally supported by the housing 2 and opening and closing openings 21a, 22a of the housing 2; a spring 5 biasing the cover 3 toward a side away from the openings 21a, 22a; a lock 4 pivotally supported by the housing 2 and keeping the cover 3 covering the openings 21a, 22a by hooking on an edge of the cover 3 covering the openings 21a, 22a; a spring 6 biasing the lock 4 toward a side close to the openings 21a, 22a; and support shafts 7, 8.

The housing 2 is made of synthetic resin, and provided with a housing main body 20, a flange 23 formed in a ring shape on an outer surface of the housing main body 20, a pair of attaching plates 24 arranged with a gap to each other on the outer surface of the housing main body and to which the cover 3 is attached, and a pair of attaching plates 25 arranged with a gap to each other on the outer surface of the housing main body and to which the lock 4 is attached.

The housing main body 20 is provide with a plurality of cavities 22 for terminals, and a housing cavity 21 for receiving the connector 9 of the charging cable. The cavities 22 are extended in a direction fitting with the connector 9 of the charging cable. Openings 22a, 22b are respectively provided on an upper end and a lower end of the housing main body 20. Terminals (not shown) with electric wires are inserted via the opening 22b at the lower end. Terminals (not shown) of the connector 9 of the charging cable are inserted via the openings 22a at the upper end. The terminals with electric wires and the terminals of the connector 9 of the charging cable are fitted with each other in the cavities 22. The housing cavity 21 is formed in a concave shape from the upper end of the housing main body 20 and in a ring shape for surrounding the plurality of cavities 22. A food (not shown) of the connector 9 of the charging cable is inserted into the housing cavity 21.

Further, the openings 22a at the upper end of the cavities 22 and the opening 21a of the housing cavity 21 correspond to the opening in claims. Namely, when the connector 9 of the charging cable is inserted into the housing 2, the cover 3 opens the openings 21a, 22a, and when not charging, the cover 3 covers the openings 21a, 22a to prevent water and dust from entering the housing 2.

The pair of attaching plates 24 is provided with a shaft hole into which a support shaft 7 is inserted. Further, the pair of attaching plates 25 is provided with a shaft hole into which a support shaft 8 is inserted. The pair of attaching plates 24 and the pair of attaching plates 25 are arranged opposite to each other 180 degrees sandwiching the center of the housing main body 20.

Figure 3:
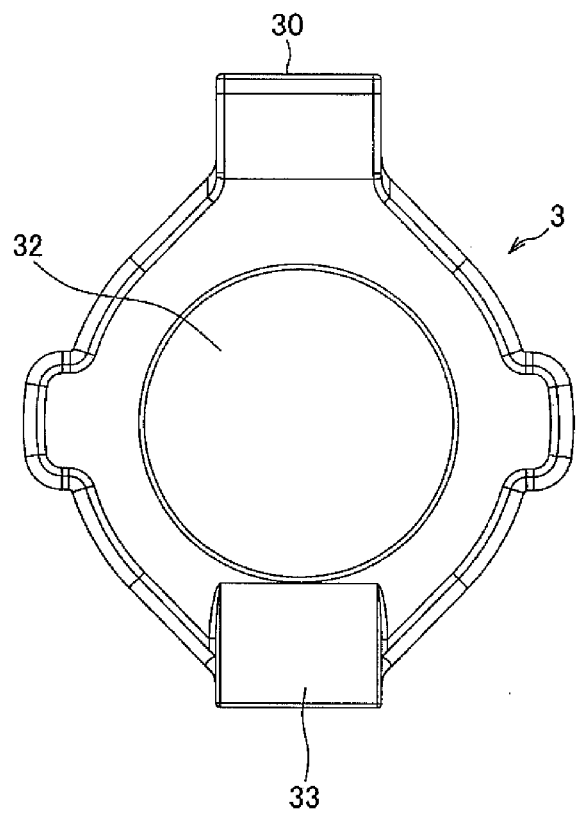
[FIG. 3]
Figure 4:
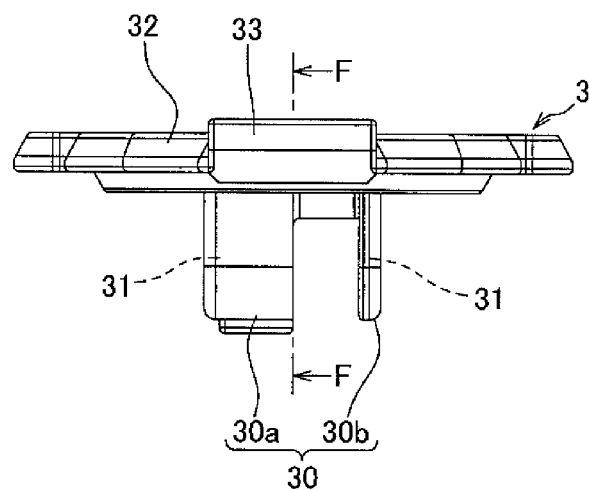
[FIG. 4]
Figure 5:
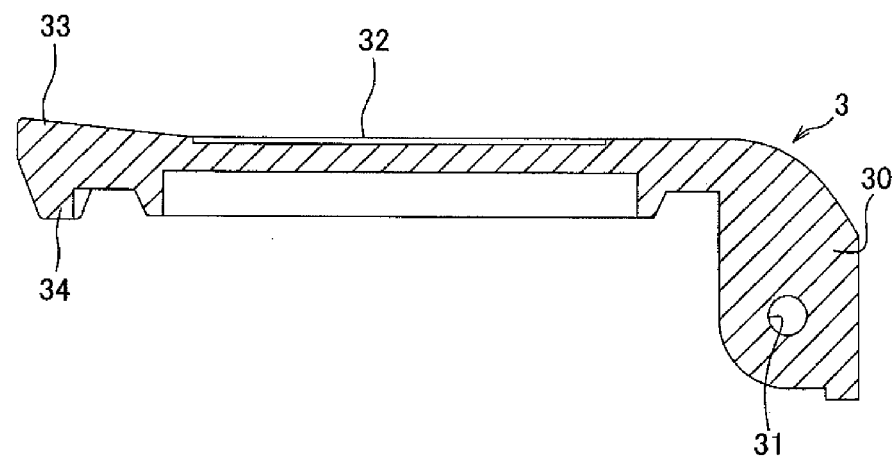
[FIG. 5]

The cover 3 is made of synthetic resin, and as shown in FIGS. 3 to 5, provided with a plate 32 overlapped with an upper end of the housing main body 20, an edge 33 provided on an outer edge of the plate 32, and a base 30 provided on an outer edge of the plate 32 and opposite to the edge 33. As shown in FIG. 2, the edge 33 is positioned outside of an outer wall of the housing main body 20. As described above, the lock 4 is hooked on the edge 33. Further, the edge 33 is provided with a protrusion 34 projected toward a later-described projection 43 of the lock 4. As shown in FIG. 4, the base 30 is composed of a pair of attaching portions 30a, 30b opposite to each other. The pair of attaching portions 30a, 30b is provided with a shaft hole 31 into which the support shaft 7 is inserted. When the pair of attaching portions 30a, 30b is positioned between the pair of attaching plates 24, and the support shaft 7 is inserted into the shaft hole 31 of the pair of attaching portions 30a, 30b and the shaft hole of the pair of attaching plates 24, the cover 3 becomes pivotally supported by the housing 2. Further, arrows A and B in FIG. 1 indicate a rotation direction of the cover 3.

The spring 5 is made by plastic deformation of a wire, and provided with a spiral portion wound a plurality of times in a spiral shape and into which the support shaft 7 is inserted, a base-side attaching portion provided on an end of the spiral portion and attached to the base 30, and a housing-side attaching portion provided on the other end of the spiral portion and attached to the housing 2. Further, the spring 5 biases the cover 3 in an arrow direction in FIG. 1.

The lock 4 is made of synthetic resin, and provided with a base 40 on which a shaft hole 41 for inserting the support shaft 8 is provided, a pushing claw 42 projected from the base 40 and arranged on an outer surface of a cover 3 covering the openings 21a, 22a, and a projection 43 projected from the base and arranged nearer the shaft hole 41 than the pushing claw 42. When the base 40 is positioned between the pair of attaching plates 25 of the housing 2, and the support shaft 8 is inserted into the shaft, hole 41 of the base 40 and the shaft hole of the pair of attaching plates 25, the lock 4 is pivotally supported by the housing 2. Further, arrows C and D in FIG. 1 indicate a rotation direction of the lock 4. As shown in FIG. 2, the lock 4 is hooked on the edge 33 in a manner that the edge 33 of the cover 3 covering the openings 21a, 22a is positioned between the pushing claw 42 and the projection 43.

The spring 6 is made by plastic deformation of a wire, and provided with a spiral portion wound a plurality of times in a spiral shape and into which the support shaft 8 is inserted, a base-side attaching portion provided on an end of the spiral portion and attached to the base 40, and a housing-side attaching portion provided on the other end of the spiral portion and attached to the housing 2. Further, the spring 6 biases the lock 4 in an arrow C direction in FIG. 1.

Figure 6:
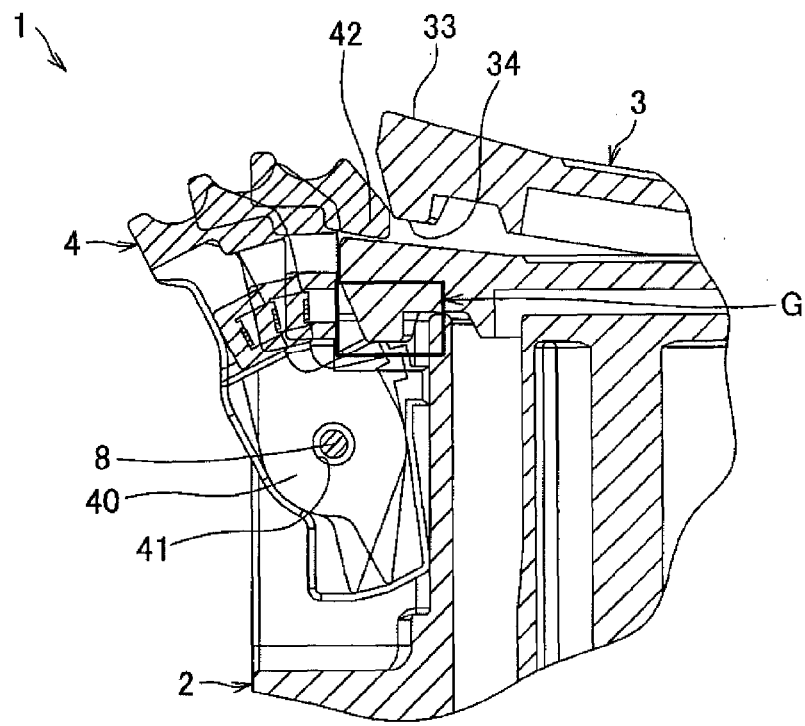
[FIG. 6]
Figure 7:
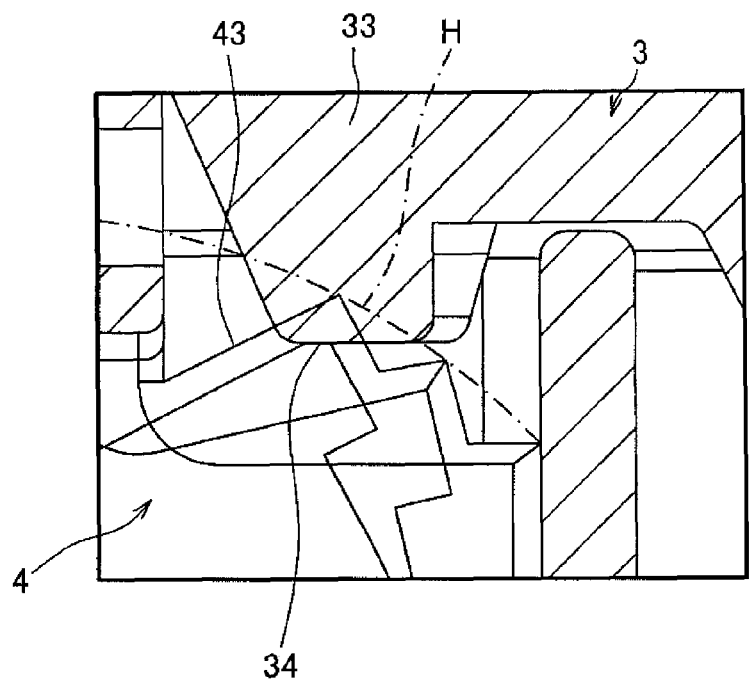
[FIG. 7]

Further, as shown in FIGS. 6 and 7, for a countermeasure against freezing of the cover 3, according to the connector 1 of the present invention, the edge 33 of the cover 3 positioned between the pushing claw 42 and the projection 43 is overlapped with a rotation track of the projection 43. Further, a dashed line H of FIG. 7 indicates a rotation track of a tip (away from the base 40) of the projection 43.

Next, an open/close operation of the cover 3 of the connector 1 will be explained. In a case of closing the opened cover 3, while the lock 4 is rotated in the arrow D direction of FIG. 1 against the biasing force of the spring 6, the cover 3 is rotated in the arrow A direction of FIG. 1 against the biasing force of the spring 5, and the lock 4 is released to be hooked on the edge 33 of the cover 3. Further, in a case of opening the closed cover 3, the lock 4 is rotated in the arrow D direction of FIG. 1 against the biasing force of the spring 6, namely, the lock 4 is released. Then due to the biasing force of the spring 5, the cover 3 is automatically opened in the arrow B direction of FIG. 1.

Figure 8:
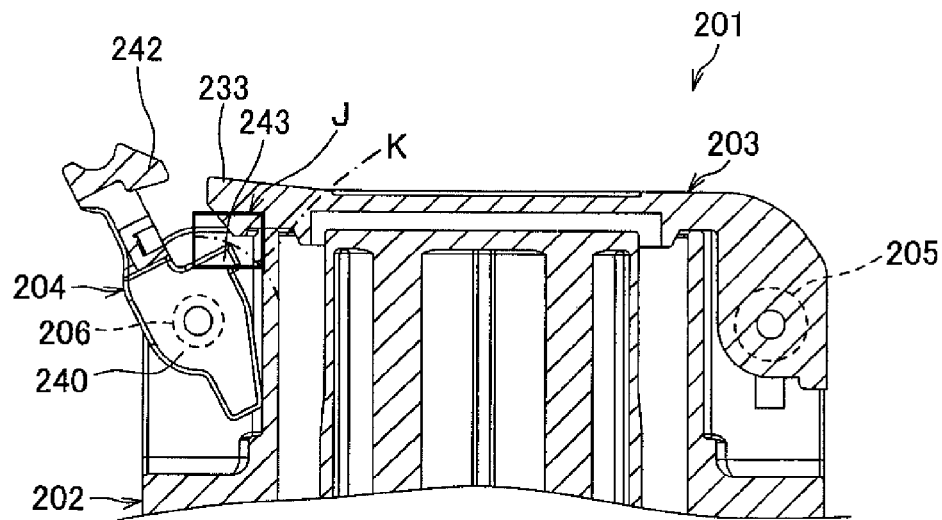
[FIG. 8]
Figure 9:
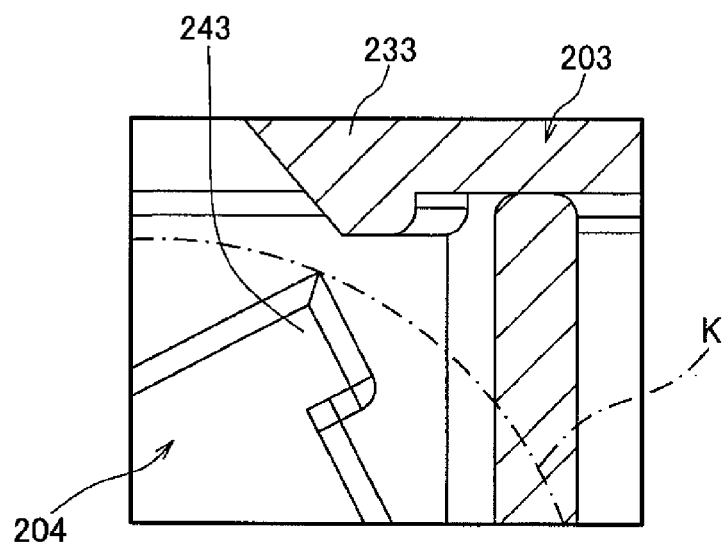
[FIG. 9]

Further, according to the conventional connector 201 explained with reference to FIG. 8, due to freezing of water attached to the surface of the cover 203, the cover 203 is firmly fixed to the housing 202. Therefore, there is a problem that even when the lock 204 is released, the cover 203 may not be opened with only the biasing force of the spring 205. However, according to the connector 1 of the present invention, even in a case that the cover 3 is not opened with only the biasing force of the spring 5 because the cover 3 is firmly fixed to the housing 2 by freezing, when the lock 4 is rotated in the arrow D direction of FIG. 1, the projection 43 of the lock 4 pushes up the cover 3 toward a side away from the openings 21a, 22a, namely, in the arrow B direction of FIG. 1 to trigger to open the cover 3, Namely, shearing stress can be generated in the ice fixing the cover 3 to the housing 2. As a result, the cover 3 can be opened easily, Further, at this time, the projection 43 abuts on the protrusion 34 formed on the edge 33 to push up the cover 3.

Further, in the embodiment shown in figures, the protrusion 34 is provided on the edge 33 of the cover 3. According to the present invention, the protrusion may be projected from the projection 43 toward the edge 33.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST 1 connector
2 housing
3 cover
4 lock
5 spring
8 support shaft
21a, 22a openings
33 edge
40 base
41 shaft hole
42 pushing claw
43 projection

The invention claimed is:

1. A connector comprising:
a housing;
a cover pivotally supported by the housing, and opening and closing an opening of the housing;
a spring biasing the cover toward a side away from the opening; and
a lock pivotally supported by the housing and keeping the cover covering the opening by hooking on an edge of the cover covering the opening,
wherein the lock is provided with a base having a shaft hole into which a support shaft is inserted; a pushing claw projected from the base and positioned at an outer surface side of the cover covering the opening; and a projection projected from the base and positioning the edge of the cover between the pushing claw and the projection,
wherein the edge of the cover positioned between the pushing claw and the projection is overlapped with a rotation track of the projection, and
wherein when the lock is pivoted so as to allow the cover to open the opening, the projection of the lock presses the edge of the cover.

2. The connector as claimed in claim 1, wherein one of the edge of the cover and the projection is provided with a protrusion projected toward the other of the edge of the cover and the projection.

* * * * *